United States Patent
Buck et al.

[11] 3,758,715
[45] Sept. 11, 1973

[54] OPTICAL RASTER PRODUCING SYSTEM

[75] Inventors: Willard E. Buck, Los Gatos; Thomas E. Holland, Sunnyvale, both of Calif.

[73] Assignee: Technical Operations, Incorporated, Burlington, Mass.

[22] Filed: June 16, 1969

[21] Appl. No.: 835,902

Related U.S. Application Data

[63] Continuation of Ser. No. 574,640, Aug. 24, 1966.

[52] U.S. Cl. .................................... 178/7.6, 350/7
[51] Int. Cl. ............................................ H04n 3/08
[58] Field of Search ........................... 178/7.6; 350/7

[56] References Cited
UNITED STATES PATENTS

| | | | |
|---|---|---|---|
| 1,791,481 | 2/1931 | Tervo | 178/7.6 |
| 1,814,382 | 7/1931 | Gustafson | 178/7.6 |
| 2,059,221 | 11/1936 | Fessenden | 178/7.6 |
| 2,157,468 | 5/1939 | Walton | 178/7.6 |
| 2,222,937 | 11/1940 | Dimmick | 178/7.6 |

*Primary Examiner*—Robert L. Griffin
*Assistant Examiner*—Richard K. Eckert, Jr.
*Attorney*—Alfred H. Rosen and John H. Coult

[57] ABSTRACT

This disclosure depicts laser beam scanning apparatus capable of producing a two-dimensional raster-type scan. A stationary input laser beam is brought to a focus in the locus of travel of a train of corner mirrors arranged convergent in the direction of the input beam and mounted for high speed rotation upon the periphery of a driven wheel. The effect of moving the corner mirror train through the beam focus is to produce an image of the beam focus which is displaced substantially rectilineraly a distance equal to twice the displacement of the mirror train. A lens system images the beam focus image in the locus of travel of an orthogonally driven second train of corner mirrors to produce raster. A projection lens collects light from the raster producing a real raster image for use in display, interrogation, and the like.

4 Claims, 1 Drawing Figure

Patented Sept. 11, 1973
3,758,715
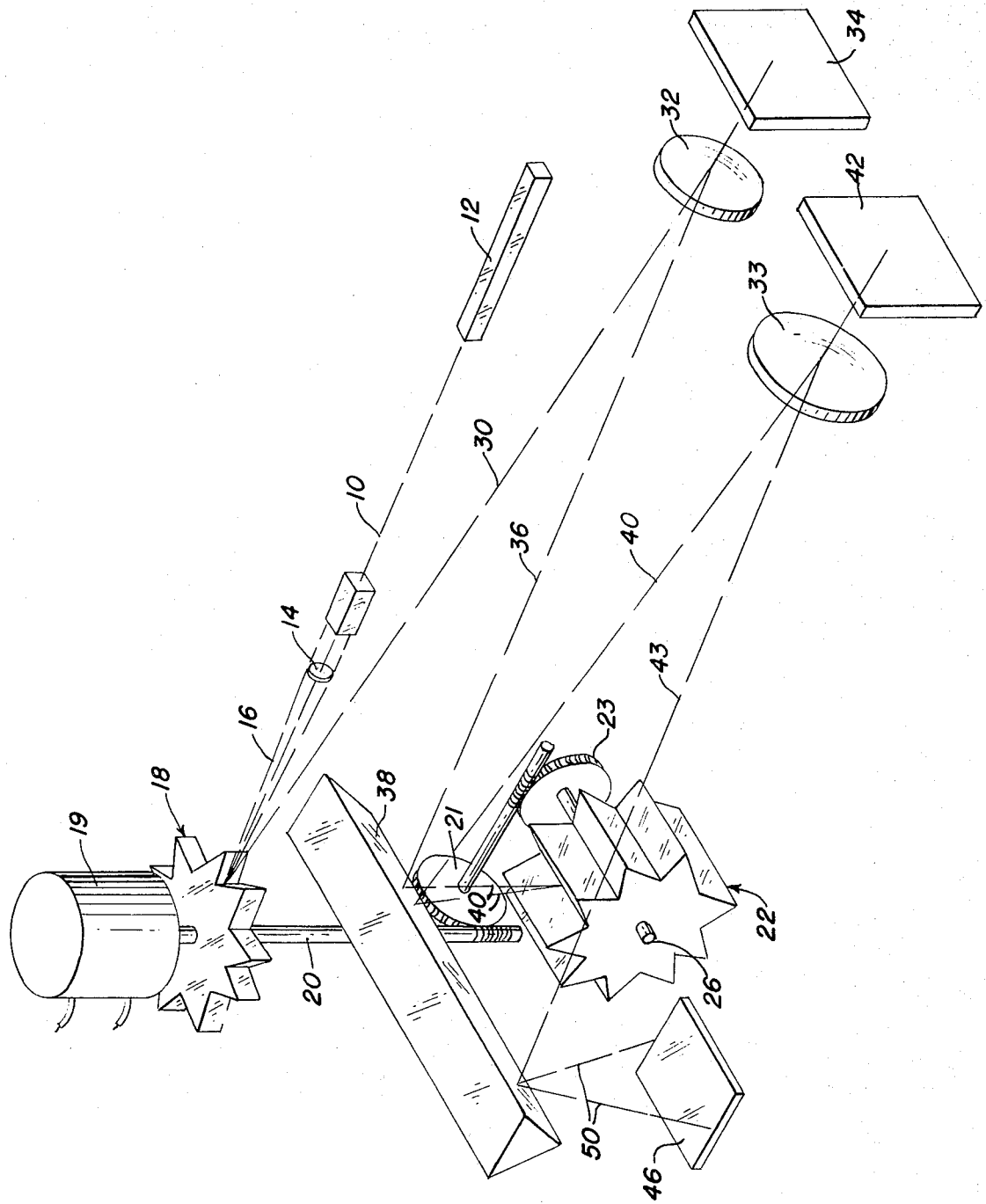
INVENTORS
WILLARD E. BUCK
THOMAS E. HOLLAND
BY
Fryer Tjensvold Fixr Phillips
ATTORNEYS

3,758,715

OPTICAL RASTER PRODUCING SYSTEM

This is a continuation of application Ser. No. 574,640 filed Aug. 24, 1966.

One example of the type of scanner to which the present invention is directed is disclosed in our assignee's copending application for U.S. Pat. Ser. No. 537,453 of Willard E. Buck and Thomas E. Holland for "Mechanical Television Scanner" now U.S. Pat. No. 3,438,102. In the operation of the scanner described in said application, one set of rotating mirrors reflects a focused beam to produce a succession of parallel scan lines at an image plane. A second set of rotating mirrors causes a swinging movement of the scanned beam at right angles to the scan lines so that the lines at the image plane are moved progressively to produce a raster. In the apparatus disclosed in said application, the first set of mirrors is shown as a plurality of reflecting surfaces arranged about a center of rotation in such a manner that each receives only a portion of the light in a collimated beam. Because of the arrangement used, the full intensity of the light available is not utilized. Furthermore the reflecting surfaces intercept and reflect the light at a point other than an image plane or point of focus with the result that any imperfection in the reflecting surfaces is exaggerated at the image plane.

The second set of rotating mirrors used in the scanner referred to consists of a plurality of right angular reflectors often referred to as "roof mirrors" operating to arrange the first set of scans in a raster-type configuration. This second set of mirrors has the advantage that all available light in the beam can be reflected by single reflecting surface as distinguished from the multi-face mirror described in the above referred to application thus avoiding noticeable reduction in intensity.

A further advantage of this type of rotating mirror scanner is that the beam can be focused at or substantially at the mirror surface so that imperfections at the mirror surface are minimized at the image plane.

It is the object of the present invention to provide an optical raster producing system with components so arranged that two sets of rotating right angular reflectors are employed to produce motion for scanning in two directions as is necessary to produce a raster.

Further and more specific objects of the invention and one manner in which it may be carried into practice are set forth in the following specification by reference to the accompanying drawing.

The drawing is a schematic view of an optical raster producing system embodying the present invention.

In the schematic illustration, many beams are for clarity represented by a single line indicating the central ray only.

In the drawing, collimated light such as a beam 10 from a laser 12 is shown as focused by a lens 14 in a converging beam 16 to a focal point at or approximately at the surface of any one of a plurality of right angular reflectors shown generally at 18 as supported in a circular pattern for rotation by a central shaft 20. A similar group of right angular mirrors is represented at 22 as rotatable by a central shaft 26. Except for certain dimensional differences, later to be referred to, these two sets of rotating mirrors may be considered as identical. The two sets of mirrors are rotated by any suitable means here shown as an electric motor 19 driving the shaft 20 which in turn drives the shaft 26 through reduction gears such as shown at 21 and 23.

The mirrors here shown could also be roof prisms in which light enters through the face of a prism and is reflected by one mirror surface to the other and then out through the face again.

As has been fully set forth in the copending application referred to above, the effect of each pair of mirror surfaces in the assembly 18 upon being moved past the focused beam such as that shown at 16 is to reflect the beam and move it through a straight line for a distance which is twice the width of the space between the outer edges of two adjacent mirrors, or in other words, twice the distance from the point of entry of the beam into one pair of mirrors to its point of exit. Since the beam 16 is focused approximately at the outer edge of a mirror unit, the reflected beam which is shown at 30 will be a diverging beam and this beam passes through a lens 32 to be reflected by a mirror 34 back through the lens 32 as a converging beam 36 focused at approximately the outer edge of the mirrors 22 toward which it has been directed by a mirror 38. The group of mirrors 22 will act in the manner of the mirros 18 to produce a repeated scan and as shown in the drawing, a diverging beam 40 diverging from the right angular reflector is again reflected by the mirror 38 and through a lens 33 to another mirror 42 which directs it back through lens 33 to be converged thereby as a beam 43 and directed by part of the mirror 38 to a focal point at an image plane 46 which may be a screen or film. The mirror 38 which is employed as a reflector for three different beams is shown as a front surface mirror formed on a triangular prism but this simply serves to avoid interference with light which could occur with a mirror of different configuration.

Because of the repeated scans produced by the right angular reflectors 22, the beam 43 converging toward its point of focus will swing between the dotted line positions illustrated at 50. Since the reflectors 18 are rotated in a plane at right angle to the plane of rotation of the reflectors 22, the scan produced by them will traverse the surfaces of mirros 22 parallel to their axis of rotation. Considering this to be a horizontal scan repeatedly traversing the image plane as between the ends of lines 50, the slower motion of mirrors 22 will result in parallel spacing of repeated scans. With the speed of rotation of the mirrors 18 and 22 properly correlated, the vertical scan can be just sufficient to produce proper spacing between the individual horizontal scans created by the mirrors 18 at the image plane and a television raster is thus produced. As a typical example in one device, the mirror assembly 18 rotates at 1,000 r.p.s. and the assembly 22 at only 0.5 r.p.s.

The use of the mirrors 34, 42 and 38 is not essential to the production of a raster of the kind described but they are employed for folding or shortening the overall optical path and thus reducing the physical dimensions of the equipment required for obtaining the desired results. Furthermore in the arrangement shown where mirrors are employed, spherical mirrors could be substituted for the mirrors shown at 34 and 42 thus eliminating the necessity for the lenses 32 and 33 and reducing light absorption which is caused by the passage of the beam through these lenses four times.

What is claimed is:

1. An optical system for causing an input light beam to perform a repetitive two-dimensional spot scan, comprising:

a first train of cooperating mirror pairs with each pair of mirrors converging in the direction of said input light beam to a line of intersection therebetween, the respective lines of intersection of said mirror pairs being in spaced parallel relationship;

first transport means mounting said first mirror train for moving said train through said input light beam in a path transverse to said direction of said input beam and such that said lines of intersection of said mirror pairs are transverse to the direction of movement of said mirror train;

stationary optical image-forming means for focusing said input beam to a spot substantially in the path of said first mirror train, movement of said mirror train through said beam by said transport means causing an image of the spot formed by said mirror pairs as they cross the beam in succession to execute a repetitive one-dimensional scan in the direction of movement of said first mirror train;

stationary positive power lens means for imaging said unidirectionally moving spot image to form a scan line;

a second train of cooperating mirror pairs with each pair of mirrors converging in the direction of light propagation to a line of intersection therebetween, the respective lines of intersection of said mirror pairs being in spaced parallel relationship;

second transport means mounting said second mirror train for moving said second train substantially through said scan line in a direction transverse to the direction of said scan line and to said direction of light propagation and such that said lines of intersection of said mirror pairs are substantially parallel to said scan line to cause an image of said spot formed by said mirror pairs in said second mirror train to execute a repetitive two-dimensional raster scan; and lens means for forming a real image of said raster scan at an output loction.

2. A system as defined by claim 1 wherein said mirrors constituting said mirror pairs in said first and second mirror trains are planar and lie in planes forming a dihedral angle of 90°.

3. An optical system for causing an input light beam to perform a repetitive two-dimensional spot scan, comprising:

a first mirror wheel rotatable about a central axis and located in said input beam such that said beam is aligned along a radius of the wheel;

a first train of cooperating mirror pairs arranged around the periphery of said first mirror wheel with each pair of mirrors converging inwardly of said wheel to a line of intersection therebetween, the respective lines of intersection of said mirror pairs being in spaced parallel relationship with respect to each other and parallel to said first wheel axis;

first positive power lens means for focusing said input beam to a spot substantially in the path of said first mirror train, rotation of said first wheel in said beam causing an image of the spot formed by said mirror pairs as they cross the beam in succession to execute a repetitive one-dimensional scan in the direction of movement of said first mirror train;

second positive power lens means for imaging said unidirectionally moving spot image to form a scan line;

a second mirror wheel rotatable about a central axis and located in the object space of said second lens means such that the optical axis of said second lens means is aligned along a radius of said second mirror wheel, the axis of said second mirror wheel being oriented effectively orthogonally with respect to said first mirror wheel axis;

a second train of cooperating mirror pairs arranged around the periphery of said second mirror wheel with each pair of mirrors converging inwardly of said second wheel to a line of intersection therebetween, the respective lines of intersection of said mirror pairs being in spaced parallel relationship with respect to each other and parallel to said second mirror wheel axis, rotation of said second mirror wheel moving said second mirror train substantially through said scan line in a direction transverse to the direction of said scan line and to the direction of light propagation to said second wheel to cause an image of the spot formed by said mirror pairs in said second mirror train to execute a repetitive two-dimensional raster scan; and lens means for forming a real image of said raster scan at an output location.

4. The system of claim 3 wherein said second mirror train is substantially wider than said first mirror train in the dimension along said lines of intersection.

* * * * *

UNITED STATES PATENT OFFICE
CERTIFICATE OF CORRECTION

Patent No. 3,758,715    Dated September 11, 1973

Inventor(s) Willard E. Buck, et al.

It is certified that error appears in the above-identified patent and that said Letters Patent are hereby corrected as shown below:

In the Abstract, line 14, after "produce" insert -- a --.

Column 1, line 33, after "by" insert -- a --.

Column 2, line 21, change "mirros" to -- mirrors --.

Column 2, line 45, after "of" insert -- the --.

Signed and sealed this 26th day of February 1974.

(SEAL)
Attest:

EDWARD M. FLETCHER, JR.　　　　C. MARSHALL DANN
Attesting Officer　　　　　　　　Commissioner of Patents